United States Patent [19]

Spindel et al.

[11] Patent Number: 4,574,362

[45] Date of Patent: Mar. 4, 1986

[54] BLOCK MODE DIGITAL SIGNAL CONDITIONING METHOD AND APPARATUS

[75] Inventors: Howard R. Spindel, Tualatin; Vincent N. Ast, Jr., Portland; Gary L. Brown, Tualatin, all of Oreg.

[73] Assignee: Tektronix, Inc., Beaverton, Oreg.

[21] Appl. No.: 367,660

[22] Filed: Apr. 12, 1982

[51] Int. Cl.[4] .............................................. G06F 5/00
[52] U.S. Cl. ............................ 364/900; 340/347 DD
[58] Field of Search ....................... 370/82, 83, 92, 94, 370/43, 99; 364/200, 900; 340/347 DD; 178/2 A, 26 A

[56] References Cited

U.S. PATENT DOCUMENTS

| | | | |
|---|---|---|---|
| 3,274,378 | 9/1966 | Crawford et al. | 235/310 |
| 3,701,893 | 10/1972 | Shimaya et al. | 235/310 |
| 4,093,823 | 6/1978 | Chu | 370/80 X |
| 4,154,983 | 5/1979 | Pedersen | 370/94 X |
| 4,168,469 | 9/1979 | Parikh et al. | 370/83 X |
| 4,205,200 | 5/1980 | Parikh et al. | 370/83 |
| 4,225,919 | 9/1980 | Kyu et al. | 370/83 X |

*Primary Examiner*—James D. Thomas
*Assistant Examiner*—David L. Clark
*Attorney, Agent, or Firm*—Francis I. Gray; Allston L. Jones

[57] ABSTRACT

Block mode is a method of formatting data when sending it to and from the host computer. Some host computer operating systems make it difficult for the user's program to send or receive the full ASCII character set. The block mode protocol lets you send and receive messages which use the full ASCII character set (including lowercase characters and control characters), even though your host computer's operating system makes it difficult to send and receive certain ASCII characters. (Indeed, even full eight-bit binary data bytes may be sent to or from the terminal in block mode.) This is accomplished by means of a packing scheme, in which messages using the full character set are packed into character strings using a subset of that character set.

Also, the block mode protocol provides error detection and automatic retransmission of bad data blocks. This lets you transfer data to and from the terminal, without errors, despite occasional noise on the communications line. Block mode is completely independent of whether or not prompt mode is used and of whether the terminal is using full duplex or half duplex communications.

When in block mode, data is packed into blocks and transmitted as a unit. Each block contains an "even-/odd" counter (block control byte one, bit one) which is used in an "ACK/NAK" protocol. This protocol lets the host and terminal inform each other when a block has been received incorrectly. (The block received incorrectly is then retransmitted.)

6 Claims, 4 Drawing Figures

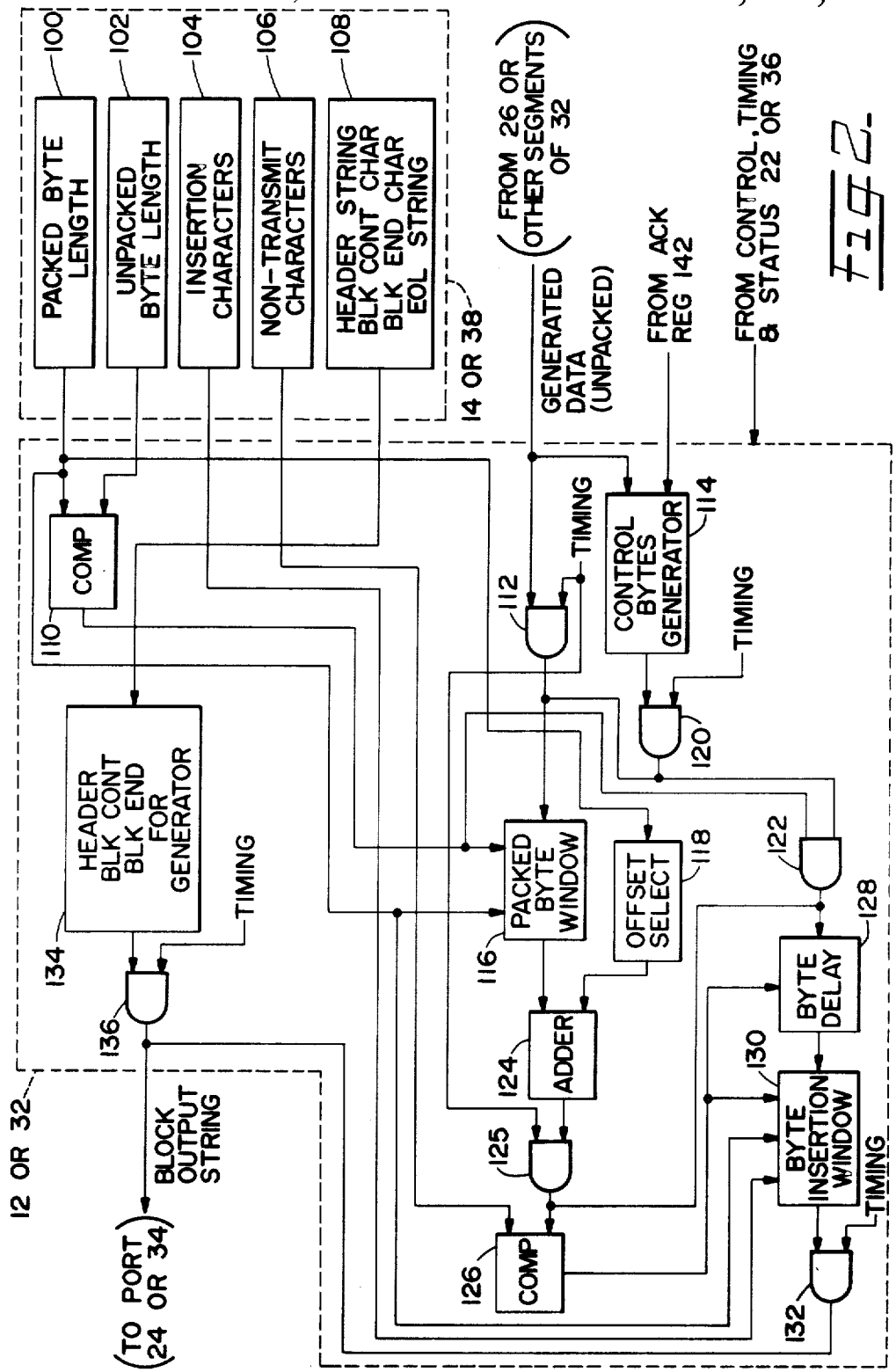

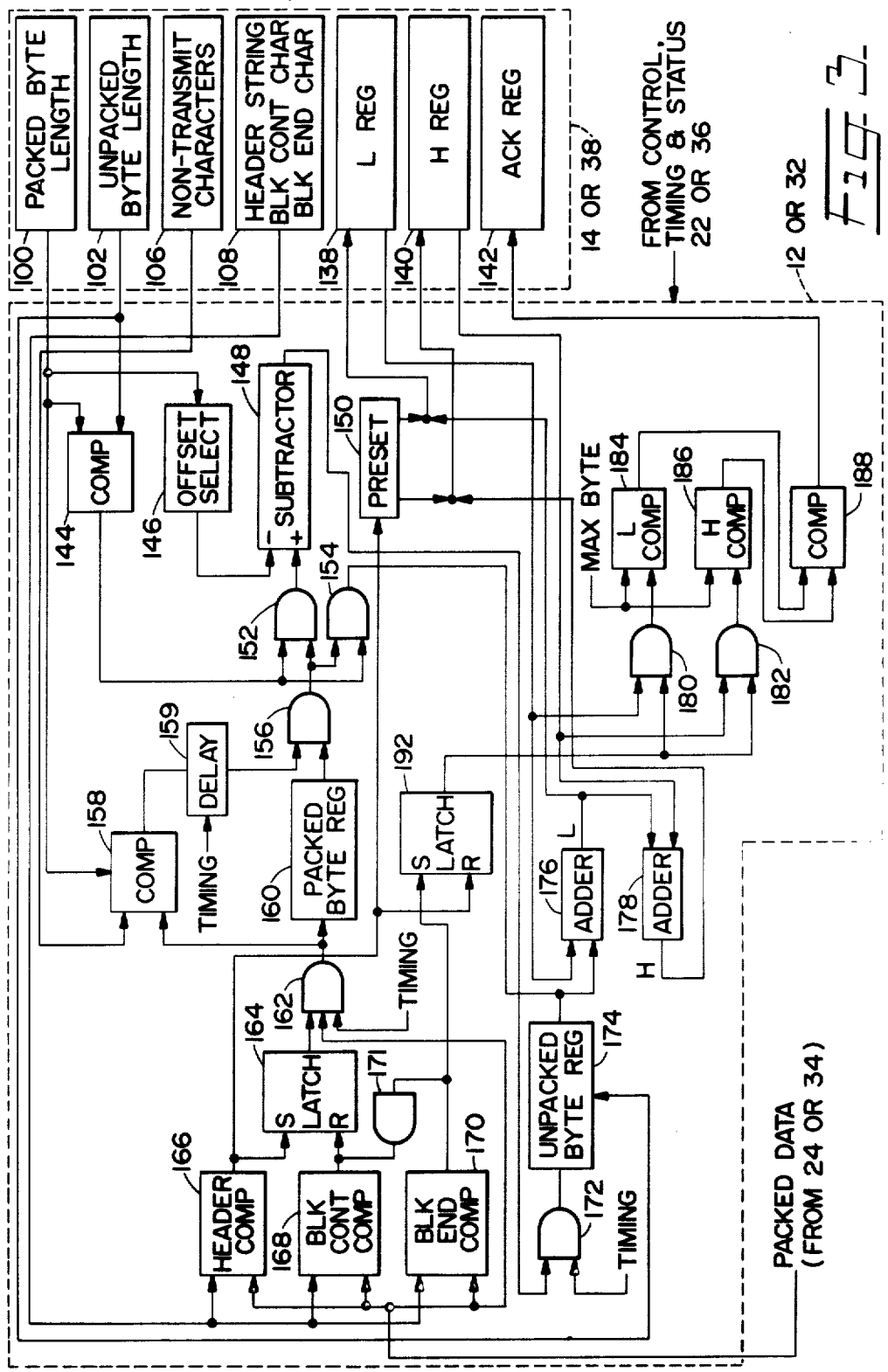

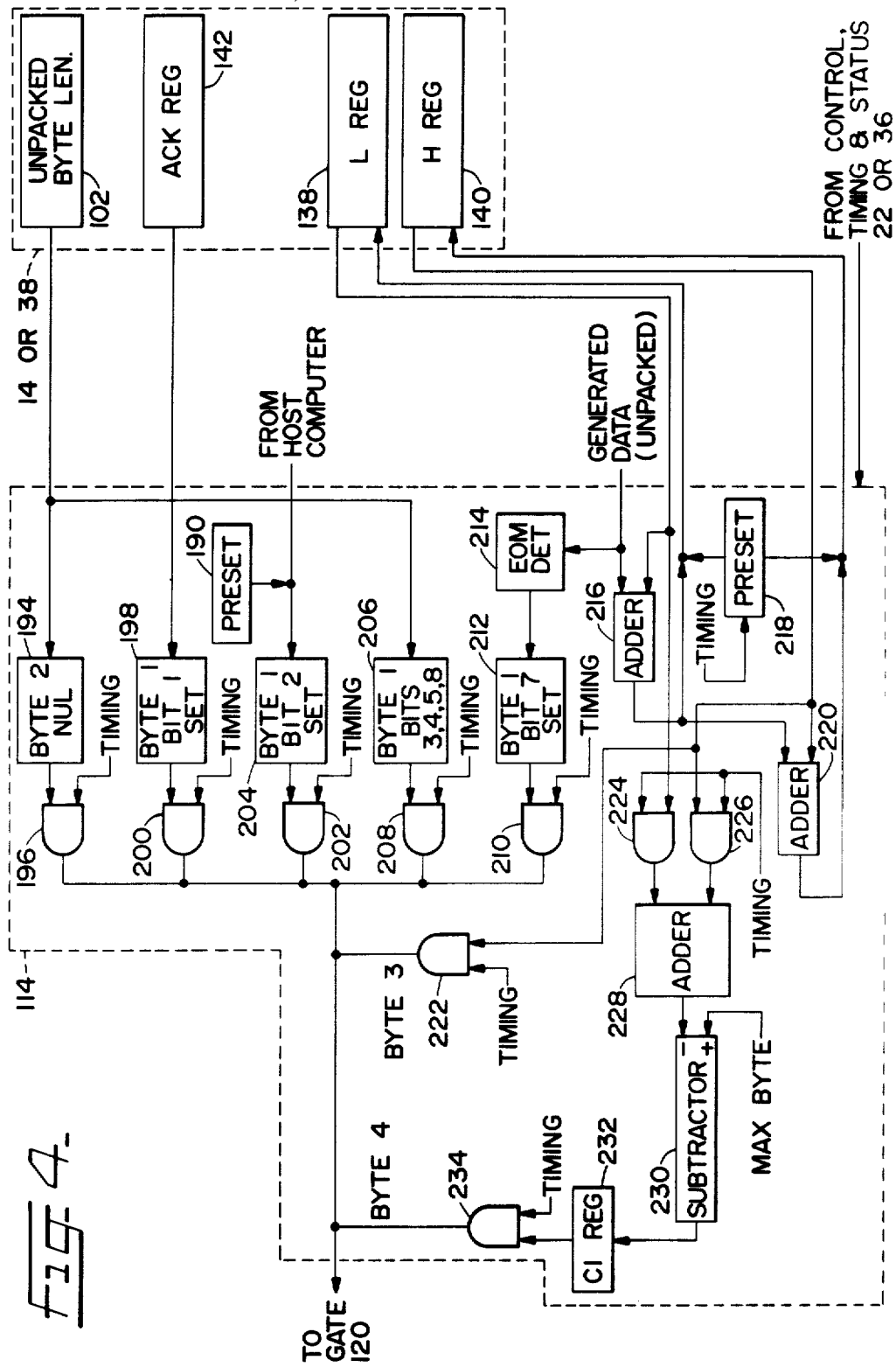

BLOCK MODE DIGITAL SIGNAL CONDITIONING METHOD AND APPARATUS

BACKGROUND OF THE INVENTION

This invention relates to signal conditioning, more specifically to conditioning the signals between host computer and an associated terminal.

The interfacing of one piece of equipment with another has always presented problems, whether the equipment is analog or digital. In digital communication there are problems with assuring that the data transferred on an asynchronous communications line was correctly received, and that there have not been overruns in either direction. In addition, the ability to interface two pieces of equipment is often hampered by the line length or control character limitations of the equipment sought to be interfaced.

Several attempts have been made to standardize the interface between various items of digital equipment. These include the RS232 standard line, ASCII character codes, and the addition of checksums to asynchronous data transmissions.

These solve only a part of the problem. There is still the problem of dealing with the extraneous interline characters which some host computers transmit, the problems of transmitting large continuous blocks of data without regard to the limits of line length of some host computers, the communication of 8-bit binary information with a host computer without losing some information, the transparency of control characters, and the synchronization of the data transmissions between the host computer and the terminal to prevent communication line overruns. The present invention provides a means for overcoming these problems.

SUMMARY OF THE INVENTION

The present invention provides a method and apparatus for conditioning a digital data string so that it may be transmitted between two digital units (e.g. a terminal and a host computer). Without using the signal conditioning capacities of the present invention, transmission of the data in its standard format (ASCII or 8-bit binary) may not be possible.

In the illustrated embodiments of the invention the data string for transmission is reformatted, or packed, into bytes having a length that is equal to the shortest of the original data byte length, and the maximum byte length acceptable to each of the digital units. If the digital units are a terminal and a host computer, the latter will generally be the mosting limiting in acceptable byte length.

Additionally, this invention prefixes a header string to the packed data to identify the source of the transmission and to exclude extraneous characters which one or both of the digital units may transmit. Following each packed data portion preselected control characters are appended.

Also, as part of the packed data following the last data byte of the block a set of control bytes are appended. These control bytes include control and end of message information, as well as, the check code to insure the accurate transmission of the data.

DESCRIPTION OF THE DRAWINGS

FIGS. 2, 3, and 4 represent a second embodiment of the present invention showing block diagrams for data packing, data unpacking and the formation of the control bytes, respectively.

DESCRIPTION OF THE PREFERRED EMBODIMENT

Figure 1:
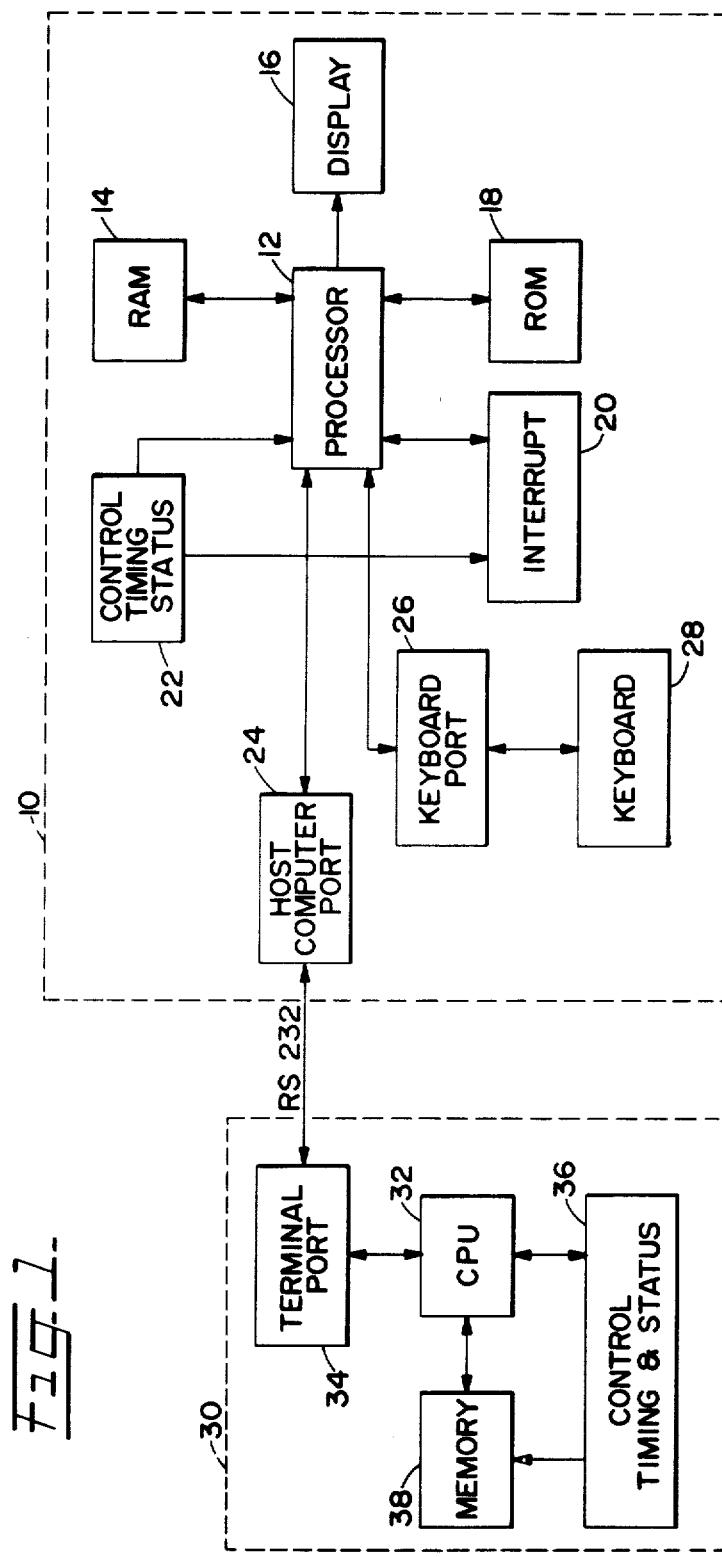
FIG. 1 is a simplified block diagram of a terminal interconnected with a host computer representing one embodiment of the present invention.

This invention provides a means for formatting data being sent between two digital pieces of equipment, e.g., a host computer and a terminal. Through the use of this invention it is possible for the communicated data to include the full ASCII character set, or full eight-bit binary data bytes. This is accomplished by means of packing the data to be transmitted in the form discussed below. Also provided is an error detection means and a means for retransmitting improperly received data strings which might have resulted from transmission noise or interference. It must also be stated that the current invention is completely independent of whether or not prompt mode is used or whether the communication is in full- or half-duplex.

This invention processes the data to be transmitted by packing it into a series of blocks. Each block has preselected identification and control segments enclosing the data bytes of a preselected length.

As a matter of convenience in our discussion we will assume that each block includes a single line of data, however, depending on the equipment, there may be no maximum length.

Blocks sent from the host computer and from the terminal have the same overall format. Each block consists of one or more lines of data as follows:

```
<block> = <block-"other-than-last"-line> ... or
          <block-last-line>
where
<block-"other-than-last"-line>
= <block-header>
  <block-packed-data>                           (1a)
  <block-continue-char>
  <EOL-string>
and
<block-last-line> = <block-header>
                    <block-packed-data>         (1b)
                    <block-end-char>
                    <EOL-string>
```

Each block begins with a special <block-header> character sequence. After the header comes the packed data, followed by a special character to mark the end of the line. This is the <block-end-char> for the last (or only) line of a block, or the <block-continue-char> if the line is not the last line of the block. After the <block-end-char> comes an end-of-line string.

The header, the continue and end characters, and the EOL string could be selected to be any convenient character or string. Additionally, the header string should incorporate information as to the source of that block, i.e., the host computer or the terminal. For our discussions the header strings are "HEADRX" for blocks sent from the host computer to the terminal, and the "HEADTX" for blocks sent from the terminal to the host computer. The <block-continue-char>s for transmission to the host computer and to the terminal are both (&). The <block-end-char>s are both ($). The <EOL-string> for transmission to the host computer is the single character, (CR) [carriage return].

The procedure for putting the terminal in block mode is as follows:

1. First, the host computer or the terminal's operator issues commands to set the various block mode parameters (e.g. packed and unpacked byte lengths).

2. Next, the terminal is armed for block mode.

3. Finally, the host computer sends a block to the terminal. The terminal enters block mode on receiving the header characters that begin the first line of that block.

The host computer removes the terminal from block mode by sending it a special block containing an "exit protocol" command in that block's block control bytes. The operator can also remove the terminal from block mode. The terminal has a maximum block length for the unpacked-data in blocks sent from the terminal to the host computer and another maximum block length for the unpacked-data in blocks sent from the host computer to the terminal.

Assume that the maximum block length is 256 characters. If the terminal is in block mode, and the operator types 500 characters before pressing RETURN, then the terminal splits that 500-characters message into two blocks. The first block's unpacked-data consists of the first 252 characters that the operator typed, plus the four block control bytes. The second block holds the remaining 248 of the 500 characters, plus the (CR) character typed by pressing RETURN, plus four block control bytes: a total of 253 characters of unpacked-data.

Likewise, if the host computer has a message of more than 252 characters to send the terminal, it must split that message into more than one block. The first block sent to the terminal would have, in its unpacked-data, the first 252 characters of the message, plus four block control bytes for that block. The remainder of the message would go into the unpack-data for subsequent blocks.

When the terminal is sending data to the host computer, it groups the data into messages. Each message text ends with an <EOM-char> (end-of-message character).

Typically, the <EOM-char> is (CR). Thus, each time the operator presses RETURN, he terminates one "message". If the terminal is in block mode, the (CR) is packed into the block and causes the terminal to end that block.

The <block packed data> consists of a sequence of bytes of a length that is compatible with the maximum byte length that the host computer can handle. The packed data is generated from unpacked data which is to be transferred to or from the host computer.

The unpacked data for a block includes the characters of the message (if any) being sent in the block, plus four more characters, the block control bytes:

<unpacked-data> = <characters-of-message> <block-control-bytes>

There are a selected number of block control bytes which are packed into the block along with the other unpacked data. If the unpacked block size is seven (ASCII data), then each control byte consists of seven binary bits. If the unpacked byte size is eight (binary data), then each control byte consists of eight binary bits.

The number of block control bytes can be any number which provides a sufficient number of bits to carry the desired control information. In the application for which the current invention was devised four block control bytes were selected.

In <control byte 1>, bit 1 was designated the least-significant bit and bit 7 or 8 was selected to be the most-significant bit. The individual bits were assigned as follows:

| Bits 1 and 2: | Block count and end-protocol. |
|---|---|
| Bit 3, 4, 5: | Reserved (always zero) |
| Bit 6: | End of file |
| Bit 7: | End of message |
| Bit 8: | Unused (not present in 7-bit bytes; always zero in 8-bit bytes) |

Bits 1 and 2 together serve two functions: they determine whether the terminal is to exit block mode, and—while the terminal is in block mode—they maintain an "odd/even" modulo two counter of blocks sent over the data communications line. Table 1 lists the four possible states of these bits, together with their meanings. Bit 6, the end-of-file bit, is set to one at the end of a file transfer.

In blocks which the terminal sends to the host, Bit 7, the end-of-message bit, when set to one, indicates that the terminal has terminated the block because it encountered an <EOM-char> or <EOM-indicator> in the data being sent. When set to zero, this bit indicates that the block was terminated only because the maximum block length was reached, and that another block follows which contains more of the same message.

In blocks sent from the host computer to the terminal, Bit 7 has a different meaning. If the bit is zero, the terminal is requested to acknowledge the block immediately (by sending an ACK block in reply). The terminal sends the ACK block immediately, whether or not it has a message to pack into that block. The ACK block contains only the four block control bytes.)

TABLE 1

MEANINGS OF LOW-ORDER BITS IN <CONTROL-BYTE-1>

| Bit 2 | Bit 1 | Meaning |
|---|---|---|
| 0 | 0 | This is an "even" block, and no attempt is being made to remove the terminal from block mode. |
| 0 | 1 | This is an "odd" block, and no attempt is being made to remove the terminal from block mode. |
| 1 | 0 | In a block sent from the host computer to the terminal, these two bits comprise a command to the terminal: Exit from block mode, but remain armed for block mode. Before exiting block mode, however, acknowledge this command by sending a 'ACK' (acknowledge) block to the host computer. In a block sent from the terminal to the host computer, these two bits mean, "This is an 'ACK' block acknowledging receipt of a command to exit block mode. The terminal is now leaving block mode, but will remain armed for block mode." |
| 1 | 1 | In a block sent from the host computer to the terminal, these two bits comprise a command to the terminal: Exit from block mode, but remain armed for block mode. Exit block mode immediately; do not send an "ACK" block to the host. In a block sent from the terminal to the host |

TABLE 1-continued
MEANINGS OF LOW-ORDER BITS IN <CONTROL-BYTE-1>

| Bit 2 | Bit 1 | Meaning |
|---|---|---|
| | | computer, this combination of bits is not allowed. |

If, however, the host computer sets Bit 7 to one, then the terminal does not acknowledge the block immediately. Instead, it waits until it has a block full of data to send, or until it encounters an <EOM-char> or <EOM-indicator> in the data it has to send to the host computer.

When sending a block to the terminal, the host computer should set Bit 7 to zero, except when it expects a response message from the terminal. If a response message is expected, the host should set Bit 7 to one.

All the bits of <control-byte-2> are reserved; they are always zero.

The last two control bytes carry a check code by which the receiving device (the terminal or the host computer) can verify that it has received the block with no errors. The check code is derived from all the unpacked data bytes which precede it: all the 7- or 8-bit bytes of meaningful data, plus the first two control bytes.

Since selected characters are being used for specific functions such as the block continue or end character or others, it is necessary to prohibit their occurrence in the packed data. When unpacked-data is packed into the block, any of the non-transmittable characters occuring in the packed-data are replaced with two-character sequences. The first character is the <block-master-character>, while the second is a selected uppercase letter. Thus, it is possible to utilize the full ASCII character set in data transmissions.

Before communicating with any computer it is necessary to determine the number of bits per byte the computer can recognize. That number in almost all instances will be either 6, 7, or 8. Thus, in packing the data we must:

Step One. Examine the number of bits per unpacked data byte, and the number of bits per packed pseudo-byte, a packed byte of the proper length for the selected host computer. If they are equal, proceed to Step Four. If they are unequal proceed to Step Two.

Step Two. The block's unpacked-data is regarded as a sequence of 7-bit or 8-bit bytes laid end to end, forming one long stream of binary bits. The first bit is the high-order bit of the first byte; the last bit is the low-order bit of the last byte. Whether the data to be transmitted is ASCII or binary determines whether the unpacked-data consists of 7-bit or 8-bit bytes.

Step Three. Next, the bit stream is divided into a series of pseudo-bytes of six, seven, or eight bits each. An offset is added to each pseudo-byte, thereby converting it into a standard ASCII character. Table 2 shows the offset which is added for each allowable pseudo-byte size.

If there are not enough bits to fill out the last pseudo-byte, an appropriate number of zeroes are appended to the end of the bit stream. On input, these extra zeroes are ignored. The extra zeroes are inserted only at the end of a block—not at the end of lines (other than the last line) within the block.

Step Four. If any of the resulting characters are among the non-transmittable characters, they are replaced with two-character sequences, starting with the master character. The first non-transmittable character specified in a user entered list of non-transmit characters is replaced, whereever it occurs, with the master character followed by the letter A; the second non-transmittable character is replaced by that master-character followed by the letter B, and so on.

TABLE 2
PACKED PSEUDO-BYTE CHARACTERISTICS

| No. of Meaningful Data Bits per Pseudo-Byte | Offset Added To Make a Standard ASCII Character | Range of Possible Decimal Equivalents for ASCII Characters To Be Transmitted |
|---|---|---|
| 6 | 32 | 32 to 95 ASCII characters from (SP) to (—) |
| 7 | 0 | 0 to 127 Full ASCII character set |
| 8 | 0 | 0 to 255 Full eight-bit data bytes |

The following is an example showing the operation of packing the data. For the purposes of this example assume that the unpacked and packed data consists of seven and six bits per byte, respectively. The host computer has just sent an odd-numbered block to the terminal, with the end-of-message bit set, and the terminal's operator types "BEGIN-PROGRAM" and presses RETURN.

Then the packing proceeds as follows:

1. The characters (B)(E)(G)(I)(N)(-)(P)(R)(O)(G)(R-)(A)(M)(CR), plus four <block-control-bytes>, comprise the <unpacked-data> for a block. The (CR)—typed by pressing RETURN—is an <EOM-char>; as such, it signals the terminal to compute the block control bytes, pack them into the current block, and send that block to the host computer.

2. The <unpacked-data> consists of the text "BEGIN-PROGRAM", the (CR) character, and the four control bytes, as follows:

| character: | (B) | (E) | (G) |
|---|---|---|---|
| binary: | 1000010 | 1000101 | 1000111 |
| character: | (I) | (N) | (—) |
| binary: | 1001001 | 1001110 | 1011111 |
| character: | (P) | (R) | (O) |
| binary: | 1010000 | 1010010 | 1001111 |
| character: | (G) | (R) | (A) |
| binary: | 1000111 | 1010010 | 1000001 |
| character: | (M) | (CR) | (A) |
| binary: | 1001101 | 0001101 | 1000001 |
| character: | (NUL) | (BEL) | (F) |
| binary: | 0000000 | 0000111 | 1000110 |

The last four characters—(A)(NUL)(BEL)(F)—are the <block-control-bytes>.

3. The terminal regroups the stream of binary bits into six-bit pseudo-bytes, as follows:

| decimal: | (33) | (17) | (24) | (60) |
|---|---|---|---|---|
| binary: | 100001 | 010001 | 011000 | 111100 |
| decimal: | (38) | (29) | (31) | (40) |
| binary: | 100110 | 011101 | 011111 | 101000 |
| decimal: | (20) | (41) | (60) | (30) |
| binary: | 010100 | 101001 | 111100 | 011110 |
| decimal: | (37) | (1) | (38) | (35) |
| binary: | 100101 | 000001 | 100110 | 100011 |
| decimal: | (24) | (8) | (0) | (15) |

| -continued | | | | |
|---|---|---|---|---|
| binary: | 011000 | 001000 | 000000 | 001111 |
| decimal: | (6) | | | |
| binary: | 000110 | | | |

4. Since the unpacked pseudo-byte size is six, Table 2 calls for an offset of 32 (binary 100000) to be added to each pseudo-byte. This converts each pseudo-byte to an ASCII character in the range from (SP) to (_):

| decimal: | (65) | (49) | (56) | (92) |
|---|---|---|---|---|
| binary: | 1000001 | 0110001 | 0111000 | 1011100 |
| character: | (A) | (1) | (8) | (\) |
| decimal | (70) | (61) | (63) | (72) |
| binary: | 1000110 | 0111101 | 0111111 | 1001000 |
| character: | (F) | (=) | (?) | (H) |
| decimal: | (52) | (73) | (92) | (62) |
| binary: | 0110100 | 1001001 | 1011100 | 0111110 |
| character: | (4) | (\|) | (\) | (>) |
| decimal: | (69) | (33) | (70) | (67) |
| binary: | 1000101 | 0100001 | 0100110 | 1000011 |
| character: | (E) | (!) | (F) | (C) |
| decimal: | (56) | (40) | (32) | (47) |
| binary: | 0111000 | 0101000 | 0100000 | 0101111 |
| character: | (8) | ("(") | (SP) | (/) |
| decimal: | (38) | | | |
| binary: | 0100110 | | | |
| character | (&) | | | |

5. The <block-continue-char>, (&), occurs at the end of this sequence. Since it is the third non-transmittable character, it is replaced by <block-master-char>(C). Assume the <block-master-char> is (#); the (&) would then be replaced by (#)(C). This gives the following sequence of characters holding the packed data:

```
<packed-data> = (A)(1)(8)(\)(F)(=)(?)(H)(4)(|)(\)
                (>)(E)(!)(F)(C)(8)("(")
                (SP)(/)(#)(C)
```

6. The terminal composes and sends a one-line block using this <packed-data>:

```
<block> = <block-header>
          <packed-data>
          <block-end-char>
          <EOL-string>
        = (H)(E)(A)(D)(T)(X)
          (A)(1)(8)(\)(F)(=)(?)(H)(4)(|)(\)
          (>)(E)(!)(F)(C)(8)("(")(SP)(/)(#)(C)
          ($)
          (CR)
```

As stated above, block control bytes 3 and 4 provide the check code to allow the receiving device to verify that the data was properly transmitted. The check code is generated as follows:

1. Two registers, H and L are each set to all ones (MaxByte) each having the same number of bits as the unpacked data, either 7 or 8 bits.

2. Each byte in the preceding unpacked data is regarded as a binary numeral and added to L. The sum is computed as with modulo 7 (or modulo 8) end-around-carry. That is, for a 7-bit unpacked byte size, whenever the sum exceeds the maximum 7-bit numeral (127), the carry bit is omitted and one is added to the least-significant bit of the sum. Likewise, if the unpacked byte size is 8-bits, then whenever the sum exceeds 255, the carry bit is omitted and one is added to the least-significant bit of the sum.

This process is equivalent to the following algorithm, in which MaxByte=127 (for 7-bit bytes) or 255 (for 8-bit bytes):

$$L = L + Byte; \quad (2)$$
$$\text{If } (L > MaxByte) \text{ THEN } L = L - MaxByte$$
$$\text{END}$$

3. As each byte is added to L, the new value of L is added to H. The same end-around-carry method is used:

$$H = H + L; \quad (3)$$
$$\text{IF } (H > MaxByte) \text{ THEN } H = H - MaxByte$$
$$\text{END}$$

4. When Steps 2 and 3 have been performed for each of the unpacked bytes preceding the check code bytes, then the two check code bytes are computed as follows:

$$C1 = MaxByte - H - L; \quad (4)$$
$$\text{IF } (C1 < 1) \text{ THEN } C1 = C1 + MaxByte;$$
$$ControlByte3 = C1;$$
$$ControlByte4 = H$$

When all four control bytes have been computed, they are packed into the block along with any other unpacked data bytes.

When a block is received and unpacked, two new registers, L and H, of the same length as the unpacked data are initialized at MaxByte. As each byte is unpacked, the unpacked byte is added to L and H above (with end-around carry). This is done on all bytes as they are unpacked, including all four control bytes. When the <block-end-char> is detected, H and L should both equal MaxByte. That is if the unpacked bytes are 7-bit bytes, then H=L=127; if they are 8-bit bytes, H=L=255. If this is not the case then a data transmission error has occurred.

Recall, from the description of the block control bytes, that the least significant bit of <control-byte-1> serves as a modulo two "odd/even" counter. This counter is used to identify a block as an ACK block (acknowledge block) or a NAK block (not acknowledge block).

When the host computer sends a block to the terminal, the terminal acknowledges correct reception of that block by sending an ACK block back to the host. This is a block with the same block count bit as the block which was correctly received.

If, however, the terminal detects a checksum error in the block, then it retransmits to the host computer the last previous block that it sent the host computer. The retransmitted block has a block count bit which is different from that in the block just (incorrectly) received. The fact that the block count bit is different identifies that block to the host computer as a NAK block.

If the host computer receives a NAK block, it retransmits the block it just sent to the terminal. If the host computer receives an ACK block, then the next block it sends will contain new data.

Likewise, when the terminal sends a block to the host computer, the host computer acknowledges correct reception of the block by sending an ACK block back to the terminal. In this case, however, an ACK block is defined with the opposite block count bit.

If the host computer, by means of the checksum bytes, detects an error in the block, it retransmits to the terminal the previous block it had sent to the terminal. That retransmitted block has a block count bit which is the same as the block count bit in the block which the host computer just (incorrectly) received. The fact that the block count bit is the same identifies that block to the terminal as a NAK block.

If the terminal receives a NAK block, it retransmits the block it just sent. If, on the other hand, the terminal receives an ACK block, then the next block it sends to the host computer can contain new data.

From the host computer's point of view, each block transaction consists of sending a block of data to the terminal and receiving an ACK block in return. (Herein, an ACK block is a block with the same even-/odd count as the block just sent.) From the terminal's point of view, each block transaction consists of sending a block to the host computer and receiving an ACK block in return. (Here, an ACK block is a block with the opposite odd/even count as the block just sent.)

When the host computer sends a block to the terminal, noise on the communications line may cause that block to be received incorrectly by the terminal. The terminal detects a checksum error and retransmits the previous block. The host computer interprets that block as a NAK block, and retransmits the block. Whenever the checksums do not agree, the host computer and terminal keep retransmitting the previous blocks sent. Provided the noise on the data communications line is not continuous, eventually the data will be successfully transferred.

After receiving a block from the host computer, the terminal ignores further characters coming from the host computer until it receives the header string that starts a new block. If the header string itself is garbled by noise on the line the terminal would not detect the start of a new block and so could not send a NAK block in response to the (garbled) block. The system would "hang", with the terminal waiting for a block that never comes. There is provision for that situation, too. The terminal has a block timeout feature, which can be preset to whatever time period the user wishes.

If the terminal sends a block to the host computer and does not receive a block back within the timeout period, then the terminal interprets the absence of a replay as an NAK, and retransmits the block just sent.

With reference to FIG. 1, there is shown a terminal 10-host computer 30 interface with the necessary elements to condition the signals between them into the block format as discussed above. Terminal 10 includes a processor 12 (e.g., 8086) under the control of control, timing and status unit 22. Also included is interrupt 20 for controlling the functioning of processor 12 in response to control unit 22. Memory is provided by RAM 14 and ROM 18, and display 16 is provided to interface with the system operator. For operator entry into terminal 10, keyboard 28 is provided with the entered data being transferred to processor 12 via keyboard port 26. Finally, to transmit and receive data to and from host computer 30, host computer port 24 is provided.

Similarly, host computer 30 includes a CPU 32 and memory 38 under the control of control, timing and status unit 36. Also included is terminal port 34 for transmitting and receiving data to and from terminal 10 via the RS232 line.

As discussed above, data is entered into processor 12 in either 7-bit ASCII or 8-bit binary form from keyboard 28 or another input source (not shown). Then depending on the maximum byte length acceptable to host computer 30, processor 12, utilizing the control information and characters (e.g. block header, block continue character, block end character, etc.) pre-stored in RAM 14 and the program steps pre-stored in ROM 18, blocks the data as described above.

At the host computer 30 end of the RS232 line the block is unpacked and if the checksum routine provides the correct result an ACK block is sent to terminal 10, together with a response to the data transferred from terminal 10 if one was required.

Upon receipt of the ACK block from computer 30, termianl 10 will transmit the next data block. However, if an NAK block or no response is received from computer 30 within a preselected time period the previous data block is again transmitted from RAM 14 where it was stored as it was first transmitted. This procedure continues until all the data is finally transmitted successfully. This same procedure also operates in reverse with the data being sent from computer 30 to terminal 10 as discussed above.

FIG. 2 shows a detailed block diagram of a second embodiment for packing the data as discussed above. The details shown here apply equally to processor 12 and RAM 14 of terminal 10 and CPU 32 and memory 38 of host computer 30. In the memory we have the following registers: packed byte length 100, unpacked byte length 102, insertion characters 104, non-transmit characters 106, and header string, block continue character, block end character, and EOL string 108. The values in each of these registers having been preselected at the users convenience, or having been required by the selection of the host computer (packed byte length) and the format of the input data (unpacked byte length).

Initially generator 134 outputs the selected header string via gate 136 under control of the appropriate control, time and status unit 22 or 36, designated as timing in the block diagram. Next, via timed gate 132 the packed data is outputted.

The packed data is generated by applying the unpacked data to timed gate 112. First the packed and unpacked byte lengths are compared by comparator 110. If they are the same the unpacked data by-passes the packing step via gate 122 under the control of comparator 110. However, if the byte lengths are unequal the unpacked data is serially applied to packed byte window 116. Under control of comparator 110 and packed byte length register 100 the unpacked data is divided into bytes of the desired packed byte length. The packed bytes are then added to an offset value determined by the packed byte length. The offset value, as discussed above, is either 32 or zero. The packed byte and the offset value are added in adder 124.

This addition step could be performed by other means. For example, a gate could be included to by-pass adder 124 when the offset is zero. Also, a look-up table could be used in place of the adder to replace each byte with the offset byte.

Following adder 124 is timed gate 125 via which each byte is compared with the non-transmit characters of register 108. If such a character is detected, the following byte is held by byte delay 128, the non-transmit byte is passed through byte insertion window 130 and timed gate 132, with a selected insertion character byte of the proper length being inserted between the non-transmit character and the next byte held in delay 128. If a non-transmit character is not detected, the packed bytes pass through delay 128 and window 130 unobstructed.

Next in the block string are the block control bytes generated by control byte generator 114 in response to the unpacked data and ACK register 142 (FIG. 4). Generator 114 is shown in detail in FIG. 4 and will be discussed below. The output of generator 114 is applied to the packing circuits via timed gate 120 with the block control bytes following the packed generated data as discussed above. Finally, generator 134 via timed gate 136 adds the block continue or end character followed by the EOL string to the block output string.

Next referring to FIG. 3, a detailed block diagram showing the unpacking of the block output string from FIG. 2 is presented. Here, as in FIG. 2, the details shown apply equally to terminal 10 and host computer 30. In the memory, in addition to those registers also included in FIG. 2 we have an L register 138, an H register 140 and an ACK register 142.

The transmitted packed data is applied to header comparator 166, block continue comparator 168, block end comparator 170, and timed gate 162. When the header is detected, latch 164 is set and L register 138 and H register 140 are preset via 150 to max byte (all 1's). The output from latch 164 together with the appropriate timing signal permits gate 162 to transmit the packed portion of the received signal. First, each non-transmit character in the packed bit stream is detected and the following inserted character byte is deleted by means of comparator 158, packed byte length register 100, non-transmit character register 106, packed byte register 160, delay 159 and gate 156. When a non-transmit character is detected by comparator 158, that character is permitted to pass through register 160 and gate 156 unobstructed, the next character (the inserted character to distinguish the non-transmit character from its control counter part) is blocked from passing gate 156 by the output of delay 159 in response to comparator 158 and a packed byte time from the timer circuit. The input data continues to ripple through packed byte register 160 being replaced by the next following byte which is then allowed to pass gate 156 when the last bit of the inserted byte has over written in register 160.

Next the packed and unpacked byte lengths are compared by comparator 144 with the selected offset value being subtracted from each packed bit if the packed and unpacked lengths are different (by means of gate 152, offset select 146 responsive to the packed byte length and substractor 148), otherwise the data string passes straight through gate 154.

If the packed and unpacked bytes are of different lengths, then it is necessary to adjust the byte length which is accomplished by gate 172 and unpacked byte register 174 responsive to the timing circuit and the value stored in unpacked byte register 102. The output string from either register 174 or gate 154 is next applied to the checksum portion of the circuit to verify the accuracy of the data transmission.

First, the data byte-by-byte is added to the value in L register 138 by adder 176 and the new value of L being stored in L register 138. The new value of L byte-by-byte is also added to the stored value of H in register 140 with the new value of H being stored in H register 140. This process continues for each byte of the packed data portion of the block string including all four of the block control bytes.

Following the fourth block control byte there is either a block continue character or a block end character. The detection of either one by comparators 168 and 170 resets latch 164. To prevent a premature reset of latch 164 comparators 168 and 170 must examine the control character and the next following character for a selected inserted character. If it was a continue character then the next segment of the block string is waited for. If it was an end block character which was received, then latch 192 is set and the values in L and H registers 138 and 140 are check to determine if the block was properly received. This is done by arming gates 180 and 182 in response to latch 192 to apply the values stored in L and H registers 138 and 140, respectively, to comparators 184 and 186. In comparators 184 and 186, L and H are each compared with max byte (all ones). If both L and H are equivalent to max byte the comparator 188 causes the value in ACK register 142 to represent an ACK value which is incorporated into the block transferred back to the data sending unit.

As discussed above, block control byte bit 1 serves as the ACK bit. If the terminal sent the data to the computer and the host computer checksum result was correct the ACK value in ACK register 142 is reversed. If the transmission was from the host computer to the terminal and the checksum was correct then the ACK value remains unchanged to provide the proper acknowledge indication. If the reverse happens in either direction, then it is read as an NAK indicator and the previous block is resent.

FIG. 4 represents the control bytes generator 114 of FIG. 2. Also shown are selected memory registers, all of which have been discussed above. Generator 114 includes byte 1 bit 1 set 198 responsive to ACK register 142 for setting the ACK/NAK bit of the block. The initial value of this bit is unimportant. Byte 1 bit 2 is a special instruction bit to the terminal from the host computer (see Table 1). This bit should be initialized to 0 (byte 1 bit 2 set 204) by the terminal at the beginning of a block being transmitted by the terminal and should retain the value assigned it by the computer during the transmission. Byte 1 bits 3, 4, 5 and 8 (if 8-bit binary data is being transmitted) should all be set to zero (reserved bits). Byte 1 bit 7 represents the end of message indicator (EOM) and is set by byte 1 bit 7 set 212 in response to an EOM character detected by detector 214 in the generated data stream. An EOM character is usually a carriage return (CR).

Bits 1 through 7 or 8 of byte 1 are added to the data stream sequentially following the last of the message bits by means of timed gates 200–210 and the value stored in unpacked byte length register 102.

Byte 2 is a reserved byte and thus it is set at nul by set 194 and is added to the data stream following control byte one by means of timed gate 196 having the same number of bits as the unpacked data.

Byte 3 and 4 provide the checksum and are generated by first presetting the L and H registers 138 and 140 to max byte. Next, each byte of the unpacked data exclusive of the control bytes are added (end-around carry as described above) to the previous value of L by means of adder 216 with each intermediate value being stored in register 138. Additionally, each intermediate value of L is added (using the same end-around carry method as for L) to the previous value of H by adder 220 with each new value of H being stored in register 140.

When this addition cycle is complete, byte 3 is set to the final value of H and added to the bit stream following byte 2 by means of timed gate 222. Byte 4 is formed by adding (end-around carry method) the final values of H and L by means of adder 228 in response to timed gates 224 and 226. Then the sum of H and L is subtracted from max byte by subtractor 230 with the result being stored in C1 register 232. The value from C1 register 232 is then applied to the bit stream as control byte 4 following control byte 3 by means of timed gate 234.

Thus, by including the checksums to generate the ACK/NAK indicator security is achieved by causing the previous block to be repeated whenever an NAK indication is received. Additional security is provided by including a timer in the terminal and the computer which causes the transmitting device which has not received at least an ACK/NAK signal within the preselected time period to again send the previous block.

Synchronization in this asynchronous environment is achieved by providing means for the terminal to hold off from notifying the computer that it is prepared to receive the next block until there is sufficient memory available in the terminal.

We claim:

1. A method of conditioning a digital data string for transmission between a first and a second digital unit on an asynchronous communication line, the method comprising the steps of:
   a. determining a maximum number of bits per byte each of the first and second digital units can accept;
   b. serializing a plurality of data bytes to be transmitted from the first digital unit into a continuous string of data bits;
   c. prefixing a preselected header string to the data string to identify the transmission source;
   d. packing the serialized data string of step b. into pseudo-bytes each having a number of bits that is no longer than the smaller of the maximum numbers determined in step a.;
   e. appending a preselected control character string following the data string to identify the end of the packed data string; and
   f. arithmetically adding an offset value to each pseudo-byte, the value of which is dependent on and preselected for the length of the pseudo-bytes.

2. A method as in claim 1 further including the steps of:
   g. determining which characters of the modified pseudo-bytes formed in step f. the second digital unit will not recognize; and
   h. replacing each non-recognizable pseudo-byte character as identified in step g. with pseudo-bytes of a selected two character sequence, each character of which is recognizable by the second digital unit.

3. A method as in claim 1 further including the steps of:
   i. transmitting and receiving the data string of pseudo-bytes of step d. to and by the second digital unit; and
   j. unpacking the transmitted pseudo-bits into a data string of data bytes of a length recognizable by the second digital unit.

4. Digital signal conditioning apparatus for conditioning a data string to be transmitted between a first and a second digital unit on an asynchronous communications line wherein the maximum number of bits per data byte that the first and second digital units can recognize is unequal, said apparatus comprising:
   first means for serializing the data bytes to be transmitted from the first digital unit into a continuous string of data bits;
   second means for prefixing a preselected header string to the serialized data string of the first means to identify the transmission source;
   third means for packing the serialized data string from the first means into pseudo-bytes each having a number of bits that is equal to the smaller of the maximum number of bits per byte that the first and second digital units can recognize, the third means including means for arithmetically adding an offset value to each pseudo-byte in the packed data string forming modified pseudo-bytes, the value of which is dependent on and preselected for the length of the pseudo-bytes; and
   fourth means for appending a preselected control character string following the data string to identify the end of the packed data string.

5. Digital signal conditioning apparatus as in claim 4 wherein the third means further includes:
   sixth means for determining which characters of the modified pseudo-bytes the second digital unit will not recognize; and
   seventh means for replacing each non-recognizable modified pseudo-byte with pseudo-bytes of a selected two character sequence, each character of which is recognizable by the second digital unit.

6. Digital signal conditioning apparatus as in claim 4 further comprising:
   eighth means for transmitting and receiving the data string of packed pseudo-bytes to and by the second digital unit; and
   ninth means, in the second digital unit, for unpacking the transmitted packed pseudo-bits into a data string of data bytes of a length recognizable by the second digital unit.

* * * * *